United States Patent [19]

Morikiyo et al.

[11] Patent Number: 4,964,499

[45] Date of Patent: Oct. 23, 1990

[54] SORTING CONVEYOR SYSTEM

[75] Inventors: Akira Morikiyo, Tokorozawa; Ryuji Morimoto, Osaka; Misao Yamahata, Tokorozawa, all of Japan

[73] Assignee: Tsubakimoto Chain Co., Osaka, Japan

[21] Appl. No.: 331,868

[22] Filed: Apr. 3, 1989

[30] Foreign Application Priority Data

Apr. 28, 1988 [JP] Japan ............................... 63-103980

[51] Int. Cl.[5] ............................................. B65G 47/10

[52] U.S. Cl. ..................................... 198/365; 198/369; 198/370

[58] Field of Search ............... 198/365, 366, 369, 370, 198/436, 372

[56] References Cited

U.S. PATENT DOCUMENTS

| | | | |
|---|---|---|---|
| 3,148,783 | 9/1964 | Michaels | 198/370 X |
| 3,977,513 | 8/1976 | Rushforth | 198/365 |
| 4,164,277 | 8/1979 | Fluck et al. | 198/369 |
| 4,509,635 | 4/1985 | Emsley et al. | 198/365 |
| 4,792,033 | 12/1988 | Iwata et al. | 198/370 X |

FOREIGN PATENT DOCUMENTS

| | | | |
|---|---|---|---|
| 1202223 | 9/1965 | Fed. Rep. of Germany | 198/369 |
| 71076 | 1/1970 | Fed. Rep. of Germany | 198/366 |
| 144018 | 8/1983 | Japan . | |
| 53317 | 3/1984 | Japan . | |
| 0171922 | 9/1985 | Japan | 198/365 |
| 1145291 | 3/1969 | United Kingdom | 198/365 |
| 1025605 | 6/1983 | U.S.S.R. | 198/365 |

*Primary Examiner*—Joseph E. Valenza
*Assistant Examiner*—James R. Bidwell
*Attorney, Agent, or Firm*—Ferrill and Logan

[57] ABSTRACT

A sorting conveyor system useful for sorting relatively small articles, such as, books is disclosed. The system comprises a take-in conveyor having a plurality of take-in vessels for receiving articles at random; a sorting conveyor having a plurality of sorting vessels disposed in a plurality of rows crossing beneath the take-in conveyor; and a timing basket table including a plurality of timing baskets disposed between the take-in conveyor and the sorting conveyor. The timing basket table receives articles from the take-in conveyor and discharges the articles to the sorting conveyor.

4 Claims, 5 Drawing Sheets

11a(11b)
31b(31a)
31d(31c)
32d(32c)
32b(32a)
21a
21b
11a
11b
21

SORTING CONVEYOR SYSTEM

FIELD OF INVENTION

This invention relates to a sorting conveyor system which is suitable for sorting relatively small articles. This invention is useful, for example, in taking in sequentially a number of books having different forwarding destinations, sorting them according to the destinations and stacking a predetermined amount at take-out positions to take them out sequentially.

BACKGROUND OF INVENTION

Examples of conventional sorting conveyor systems are disclosed, for example, in Japanese patent application Laid-open Nos. 144018/1983 and 53317/1984. In these prior art systems, a sorting conveyor is arranged to constitute a vertically endless loop; and take-out outlets for each forwarding destination are disposed along the horizontal path.

Thus, if there are a great number of destinations, the horizontal path must inevitably be long. However, there is a limitation in the length of the horizontal path as it requires a larger installation space. Consequently, should it become necessary to increase the number of outlets beyond the limitation, it is necessary to increase the number of the sorting conveyors themselves in order to increase the number of the horizontal paths.

However, according to such an arrangement, it is of course necessary to introduce articles to a particular conveyor such that the destinations of said articles may coincide with the destinations assigned to said particular conveyor. This would entail a troublesome preliminary sorting for each conveyor; and it is not possible to introduce articles having different destinations at random.

SUMMARY OF INVENTION

The present invention is a sorting conveyor system comprising a take-in conveyor having a plurality of take-in vessels for introducing articles at random; a sorting conveyor having a plurality of sorting vessels disposed in a plurality of rows crossing with said take-in conveyor at a lower level; and a timing basket table including a plurality of timing baskets disposed between the take-in conveyor and the sorting conveyor, whereby the timing basket table may receive articles from the take-in conveyor and discharge the articles to the sorting conveyor at said crossing positions.

A number of articles having different destinations which have been introduced into the system at random by means of the take-in conveyor are discharged at the crossing positions with each sorting conveyor such that only the articles having the specific destinations assigned to said sorting conveyor are received in the timing baskets; and the articles discharged to the sorting conveyor from the timing basket may be further sorted at the respective sorting positions according to their destinations. Thus, the total number of the sorting destinations of articles is the total sum of the number of sorting destinations of each sorting conveyor.

EMBODIMENTS

Figure 1:
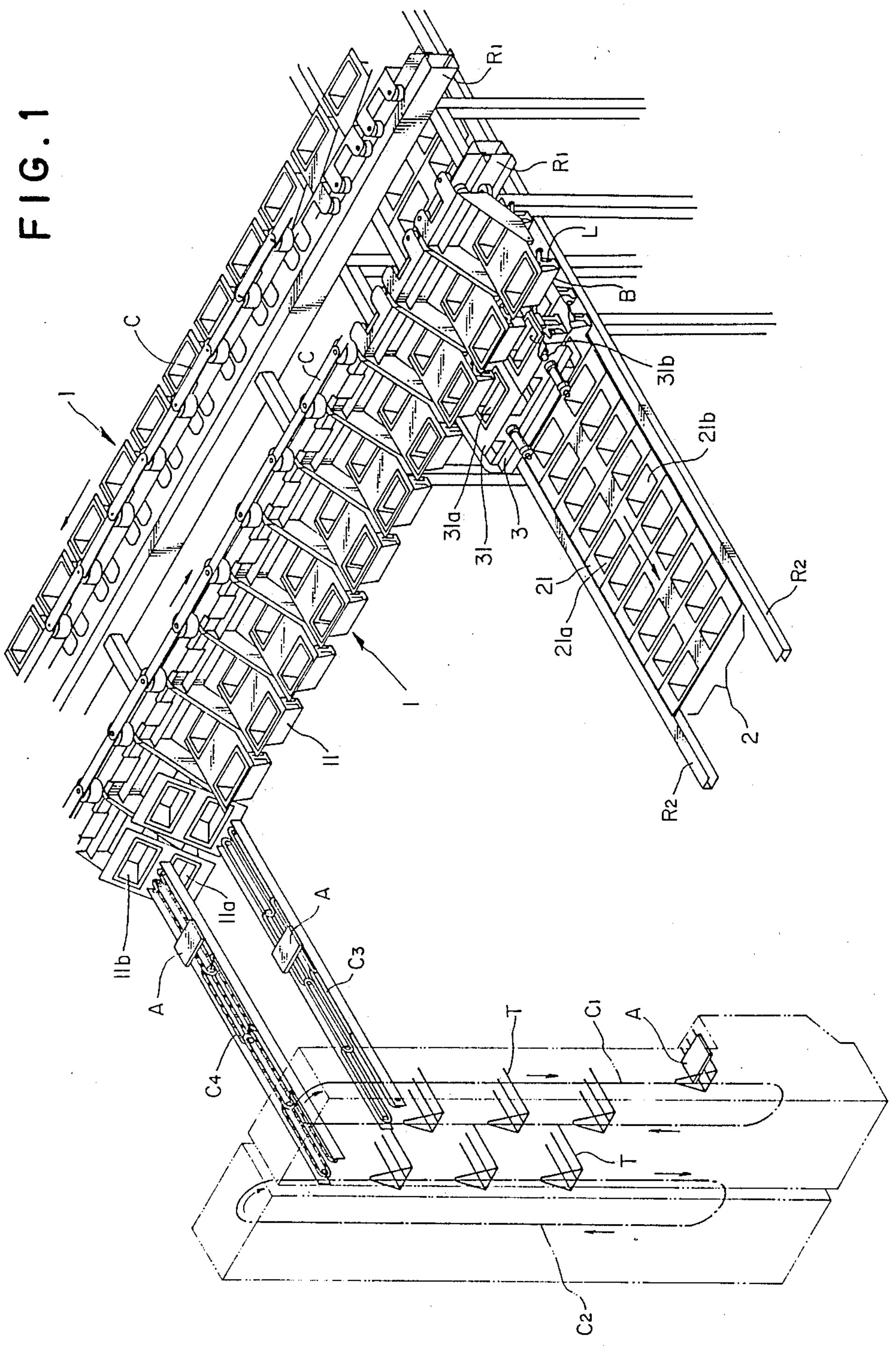
FIG. 1 is a perspective view showing the inter-relationship among a take-in conveyor, sorting conveyor and a timing basket table.
Figure 2:
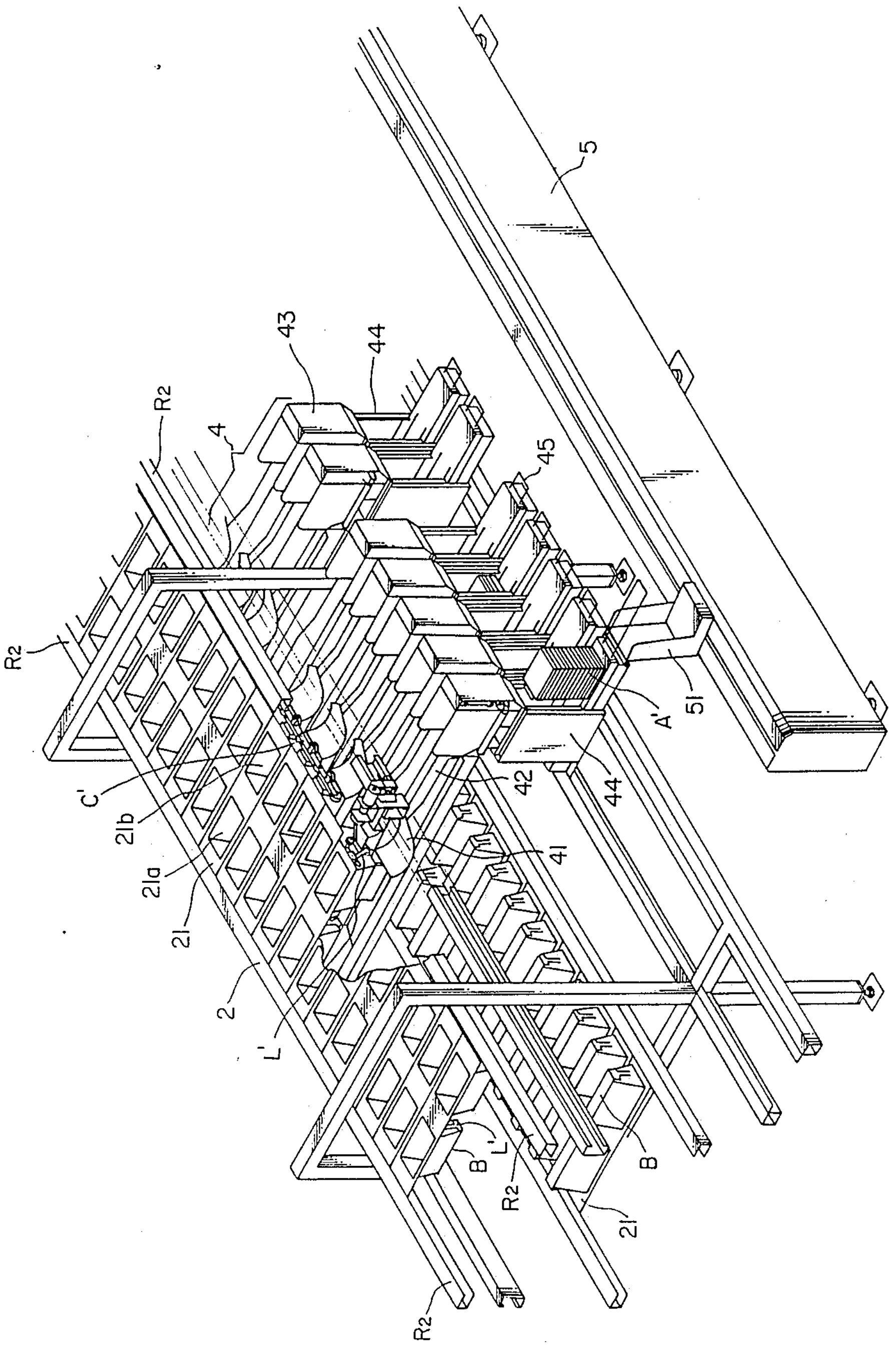
FIG. 2 is a perspective view at the sorting position of articles.

FIG. 1 illustrates the inter-relationship among a horizontally circulating take-in conveyor 1, a sorting conveyor 2 arranged in a plurality of rows (only one row is shown in the drawing) crossing with the take-in conveyor 1 at a lower level and a timing basket table 3 having a plurality of timing baskets arranged at said crossing position. And FIG. 2 shows the inter-relationship between the vertically circulating sorting conveyor 2 (only one row is shown) and a sorting/stacking means 4 at the sorting positions.

In FIG. 1, vertical tray conveyors C1 and C2 are adapted to circulate in the direction as indicated by arrows. A plurality of articles to be sorted are deposited onto a number of comb-like trays T at random. As the trays T descend, the articles A may be transferred to loading conveyors C3 and C4 which have the respective starting ends crossing with the respective tray conveyors C1 and C2. The loading conveyors C3 and C4 are adjacent to each other and may be driven independently from each other.

The opposite ends of the loading conveyors C3 and C4 oppose article receiving vessels 11*a*, 11*b* of the vessel elements 11 mounted to the take-in conveyor 1 which is adapted to be driven intermittently. In this example, two vessels (or containers) 11*a* and 11*b* are provided to one vessel element 11.

As mentioned before, each loading conveyor C3 or C4 is adapted to be operated independently, so that articles A may be directed into the vessels 11*a* or 11*b* adjusting to the timing of the vessels 11*a* and 11*b* reaching said opposite ends of the conveyors C3 and C4.

The articles A which have been received in the vessels 11*a*, 11*b* are discharged into the vessels 31*a*, 31*b*, 32*a*, 32*b* (see FIG. 3) of the timing baskets 31, 32 according to the destinations assigned to each of the sorting conveyors 2, 2, 2, 2 . . . at the crossing positions with said conveyors arranged in a plurality of rows. Said vessels 31*a*, 31*b*, 32*a*, 32*b* are adapted to discharge the articles A held therein in a timely manner into the vessels 21*a*, 21*b* of the sorting conveyor 2 when the vessels 21*a* or 21*b* is immediately beneath said vessels 31*a* or 31*b* or 32*a* or 32*b*.

And, the articles A received in the vessels 21*a*, 21*b* of the sorting conveyor 2 are sorted and storaged into the sorting/stacking means 4 having specific destinations and stationed at each sorting position. From there, the articles A having the particular destination are carried out by means of the take-out conveyor 5 for the purpose of packaging, etc.

In the next place, the components of the present invention will be explained in greater detail.

TAKE-IN CONVEYOR

The take-in conveyor 1 which is adapted to be operated intermittently has a number of vessels 11 each of them consisting of a pair of article receiving vessels 11*a*, 11*b* mounted to a horizontally circulating endless chain C which is guided by means of a guide rail R1. Each vessel element 11 is adapted to be tilted so as to receive an article A from the conveyors C3 or C4 as it contacts a cam rail (not shown) near the ends of said conveyors. Each vessel 11*a*, 11*b* has a bottom plate B which may be opened by means of a lever mechanism L also operated by a cam mechanism.

SORTING CONVEYOR

The sorting conveyor 2, 2, 2, . . . arranged in a plurality of rows crossing with the take-in conveyor 1 at a lower level has a plurality of sorting vessels 21 mounted to an endlessly circulating chain C' (see FIG. 2) which is guided by a guide rail R2. Each of said sorting vessels 21 has a pair of article receiving vessels 21*a*, 21*b* each of which includes a bottom plate B openable by means of a lever mechanism L' which is similar to the lever mechanism L as afore-mentioned.

TIMING BASKET TABLE

Figures 1, 2, 3, 3A, 3B, 3C:
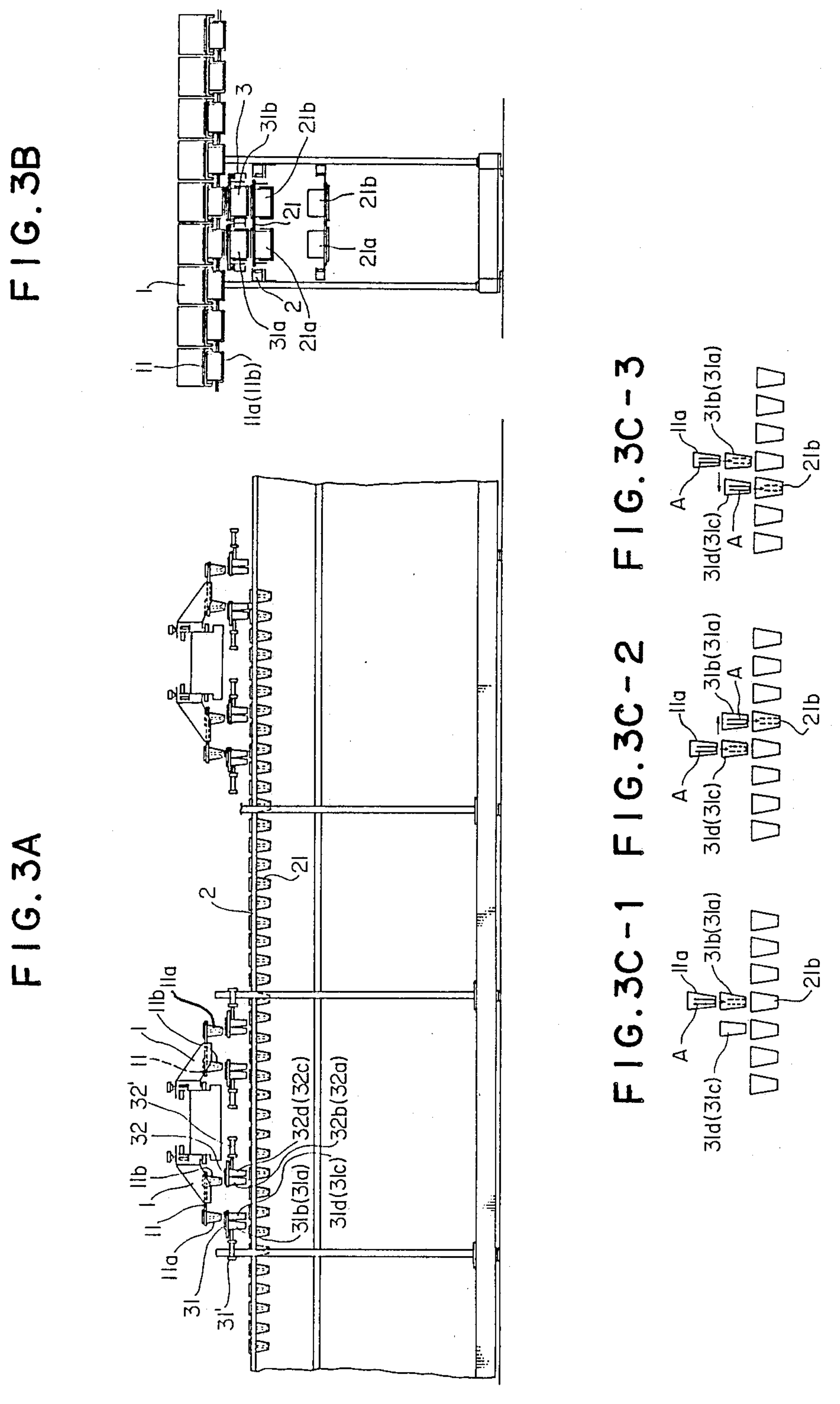
FIG. 3A is a front view.
FIG. 3B is side view to describe the operation of the timing basket and FIG. 3C (1) to (3) are illustrative of the operation.

The timing basket table 3 is disposed between the take-in conveyor 1 and the sorting conveyor 2 at the crossing position of those two conveyors. As shown in FIGS. 3A and 3B, the timing basket table 3 consists of timing baskets 31 and 32 corresponding to the article receiving vessels 11*a* and 11*b* of the take-in conveyor 1, respectively, the former having four receiving vessels 31*a*, 31*b*, 31*c* and 31*d*; and the latter having receiving vessels 32*a*, 32*b*, 32*c* and 32*d*. The same arrangement is also found with respect to the return path of the take-in conveyor 1 as shown in FIG. 3A.

Each of the timing basket 31, 32 may be moved to and fro by means of cylinder mechanisms 31' and 32' respectively as shown in FIG. 3A in the directions depicted in FIG. 3C.

With reference to FIG. 3C, when the article receiving vessel 11*a* reaches just above the receiving vessel 31*b* of the timing basekt 31, in case the article A contained in the vessel 11*a* has a destination assigned to the first row of the assorting conveyor 2, a lever mechanism for opening the bottom plate B is actuated so as to discharge the article A into the vessel 31*b* of the timing basket 31 being controlled by a computer into which the destinations of each article have been input at the time the articles were introduced into the tray conveyors C1 or C2.

The timing basket 31 which has received the article A as mentioned above, is moved by means of the cylinder 31' so that the adjacent vessel 31*d* may be positioned just beneath the vessel 11*a* of the take-in conveyor 1 on standby.

On the other hand, the vessel 31*b* which contains the article A discharges the article A to an empty vessel 21*b* of the continuously moving sorting conveyor 2 as the bottom plate is opened when an empty vessel is detected by means of an appropriate, known, detecting means. It is relatively easy to detect an empty vessel, if the vessels are transparent.

If the next article A has been discharged into the adjacent vessel 31*d*, the timing basket 31 is restored to the original position by means of the cylinder 31' such that the vessel 31*b* again is situated just beneath the vessel 11*a* on stand-by; and the vessel 31*d* containing the article A is adapted to locate an empty vessel 21*b* so as to discharge the article A thereinto.

Thus, at the crossing positions as above mentioned, the timing basket 31 is capable of receiving and discharging the articles between the intermittently moving take-in conveyor 1 and the continuously moving sorting conveyor 2 without interruption.

Another timing basket 32 functions similarly.

SORTING/STACKING MEANS

The articles A which have arrived at their sorting positions by means of the sorting conveyor 2 are discharged by means of the bottom plate opening lever mechanism L1; and are taken out by means of the sorting/stacking means 4.

The sorting/stacking means 4 comprises a chute 41 for slidably guiding articles A discharged from the vessels 21*a*, 21*b* of the sorting conveyor 2, a belt-conveyor type feeder 42 connected to the chute 41, an article receiver/dropper 43 and a stacking box 44.

Figure 4B:
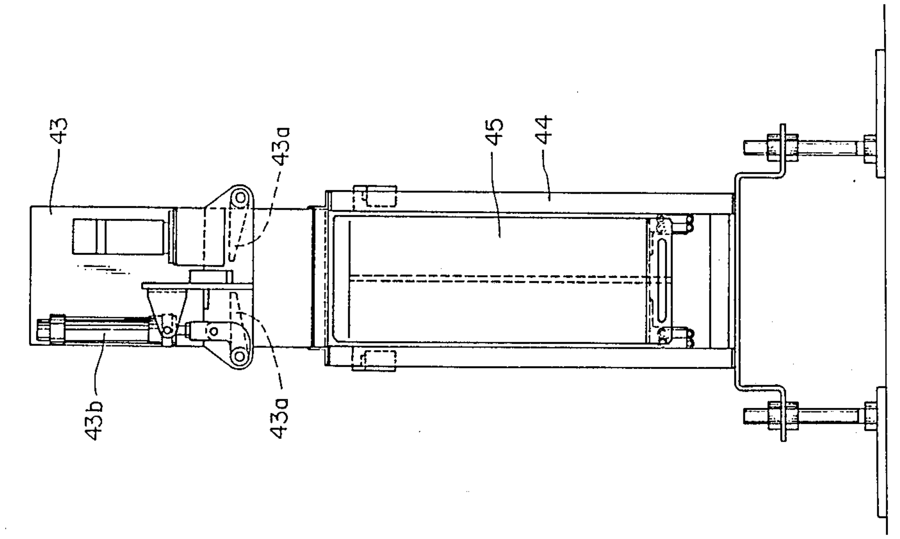
FIG. 4A is an enlarged side view of a sorting/stacking means and FIG. 4B is a front view thereof.
Figure 4A:
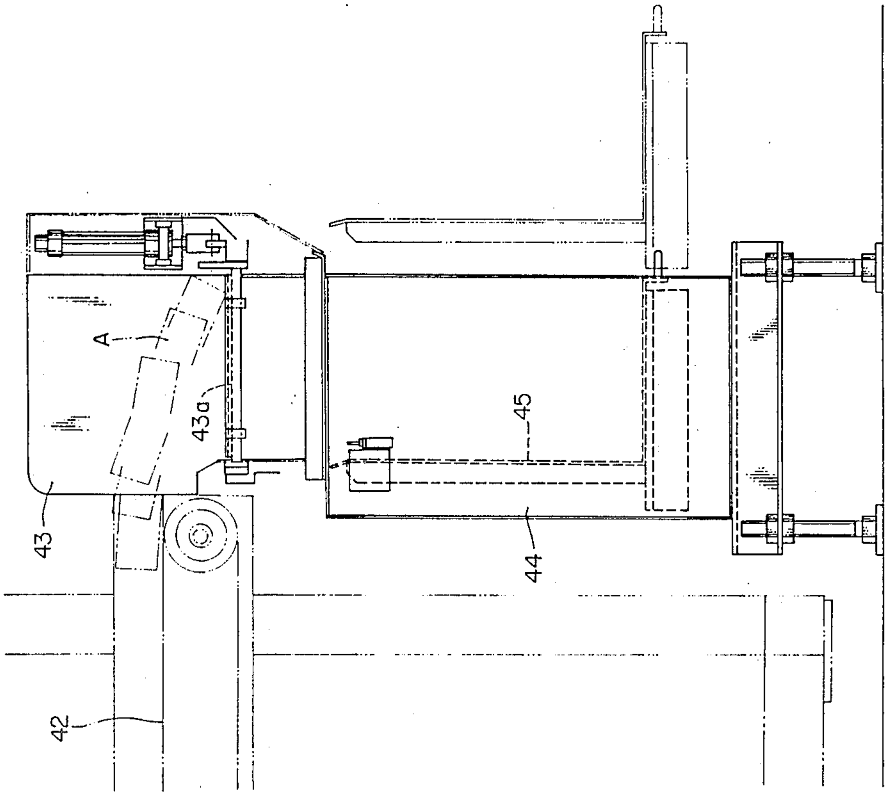

The article receiver/dropper 43 includes, as shown in FIGS. 4A and 4B, a pair of bottom plates 43*a*, 43*a* which are openable simultaneously by means of a cylinder means 43*b*.

The articles A which have been conveyed by means of the feeder 42 first fall onto the bottom plates 43*a*, 43*a* so as to be straightened; and held horizontally thereon. Then, the bottom plates 43*a*, 43*a* are opened by means of the cylinder 43*b* so as to discharge the articles A. Thereafter, the bottom plates 43*a*, 43*a* are closed to receive articles A again.

On the other hand, the discharged articles A are stacked sequentially within the stacking box 44.

As a predetermined quantity of the articles is stacked as indicated by the reference A', the L-shaped frame 45 provided in the stacking box 44 is drawn out and is manually transferred to the tray 51 of the take-out conveyor 5 so as to be carried out for the purpose of the requisite packaging, etc.

Figure 5:
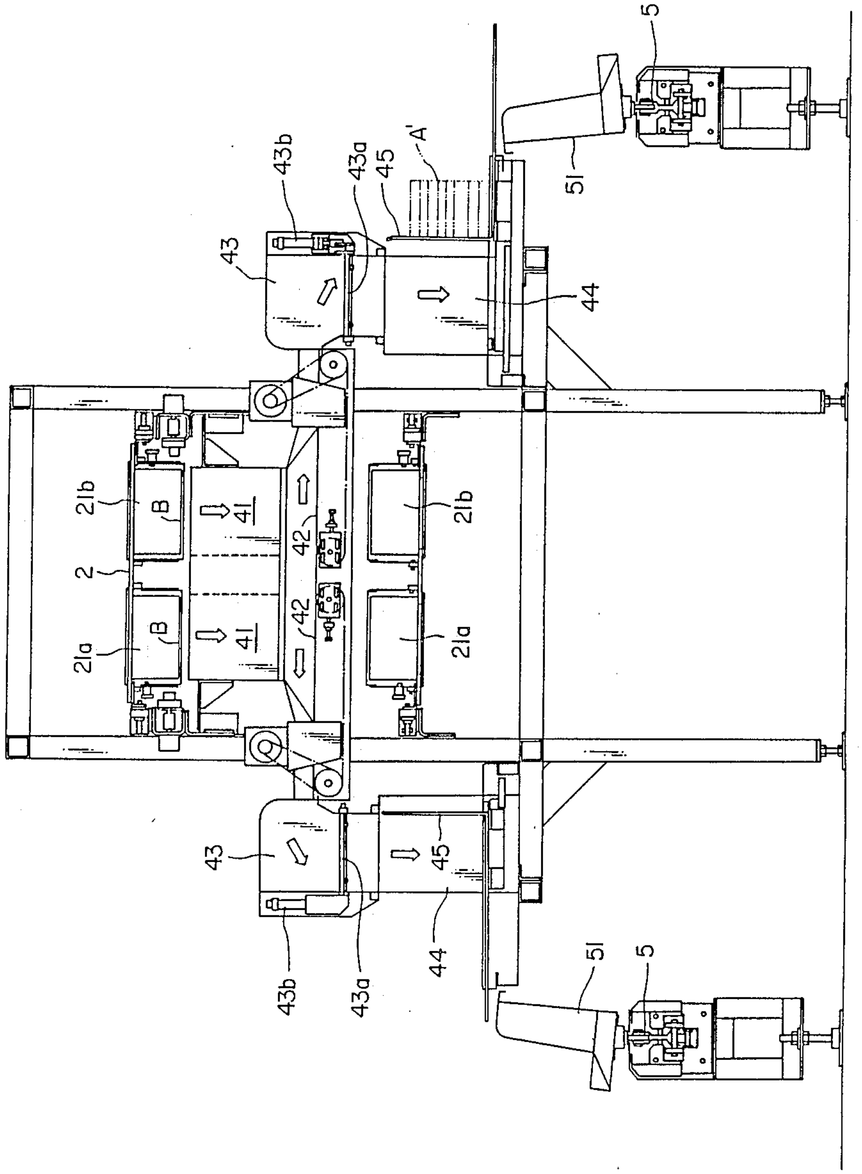
FIG. 5 is a side view partly broken away showing the relationship between the sorting conveyor and the sorting/stacking means.

FIG. 5 shows the detail of the sorting/stacking means 4. As mentioned before, the bottom plate B of the vessels 21*a*, 21*b* of the sorting conveyor 2 are opened by means of the lever mechanism L in response to the computer-controlled signal representing the respective destinations. Then, the articles A fall onto the feeder 42 being guided by the chute 41 as indicated by the arrows; and are further conveyed in opposite directions as illustrated by the arrows by the feeder·42; and are discharged onto the article receiver/dropper 43 so as to be horizontally held thereon. Then, the articles A are dropped into the stacking box 44 as the bottom plates 43*a*, 43*a* are opened.

And, as a predetermined quantity of the articles is stacked as indicated by the reference A', the L-shaped frame 45 provided in the stacking box 44 is drawn out and is manually transferred to the tray 51 of the take-out conveyor 5 so that the articles are carried out to their destinations.

Although the take-in conveyor 1 is illustrated as a chain conveyor in the above-described embodiment, it is also possible to convey the bottom opening vessels by means, for example, of a rotating driving shaft for frictionally driving rollers attached to the vessels. Also, the sorting conveyor 2 may be a so-called slat conveyor.

According to the present invention, a greater number of crossing positions for sorting articles may be created between the take-in conveyor and the sorting conveyor, since the sorting conveyor may be arranged in a plurality of rows at a level lower than that of the take-in conveyor. Since different sorting destinations may be assigned to each crossing position, the number of forwarding destinations of the sorted articles can be significantly increased.

Moreover, it is possible to sort a great number of articles which are introduced at random into the system having different forwarding destinations.

The provision of the timing basket at the crossing positions makes the synchronous operations of the take-in conveyor and the sorting conveyor unnecessary; in other words, it is not necessary to align the respective vessels of the take-in conveyor and the sorting conveyor in the vertical direction at the crossing positions, as the timing basket may function as a kind of buffer between those two conveyors.

Furthermore, the article receiver/dropper and the stacking box provided at the sorting positions serve to facilitate to take out a predetermined amount of articles as one unit with high efficiency.

What is claimed is:

1. A sorting conveyor system comprising a take-in conveyor having a plurality of take-in vessels for introducing articles at random:

a sorting conveyor having a plurality of rows of sorting vessels crossing with said take-in conveyor at a lower level;

a timing basket table including a plurality of timing baskets disposed between the take-in conveyor and the sorting conveyor, whereby the timing basket table may receive articles from the take-in conveyor and discharge the articles to the sorting conveyor at said crossing positions; and reciprocating means at said timing basket table to reciprocate said timing baskets horizontally in directions parallel to said sorting conveyor from a first position overlying one sorting vessel to a second position overlying another sorting vessel.

2. The sorting conveyor system according to claim 1 wherein each of the take-in vessels, sorting vessels and the timing basket includes bottom plates openable by means of a lever mechanism.

3. The sorting conveyor system according to claim 1 wherein the sorting conveyor includes a sorting/stacking means comprising a chute, a feeder, an article receiver/dropper and a stacking box.

4. The sorting conveyor system according to claim 1 wherein said take-in vessels move in a horizontal plane.

* * * * *